United States Patent [19]

Gee

[11] 4,228,880
[45] Oct. 21, 1980

[54] PULSE CONTROL OF AN ELECTRO MAGNETICALLY ACTUATED VISCOUS FLUID COUPLING

[75] Inventor: Thomas A. Gee, Allen Park, Mich.

[73] Assignee: Eaton Corporation, Cleveland, Ohio

[21] Appl. No.: 945,735

[22] Filed: Sep. 25, 1978

[51] Int. Cl.$^2$ .................... F16D 35/00; F16D 43/25
[52] U.S. Cl. ............................... 192/58 B; 123/41.12; 192/82 T; 192/84 R; 236/35; 251/129
[58] Field of Search ............ 91/429; 123/41.12, 41.46; 192/58 B, 82 T, 84 R; 251/129, 141; 236/35, 46 F; 137/468, 487.5

[56] References Cited

U.S. PATENT DOCUMENTS

| | | | |
|---|---|---|---|
| 3,055,473 | 9/1962 | Oldberg et al. | 192/58 B |
| 3,094,132 | 6/1963 | Byloff | 91/429 X |
| 3,250,355 | 5/1966 | Weir | 192/58 B |
| 3,470,892 | 10/1969 | Barker | 251/141 X |
| 3,659,631 | 5/1972 | Rakoske | 251/141 X |
| 3,874,407 | 4/1975 | Griswold | 251/129 X |
| 4,056,178 | 11/1977 | Detty | 192/58 B |
| 4,103,695 | 8/1978 | Aono | 251/129 X |

Primary Examiner—Allan D. Herrmann
Attorney, Agent, or Firm—R. J. McCloskey; J. W. Yakimow

[57] ABSTRACT

A viscous fluid coupling employing an electro magnet which receives electrical pulses in response to a signal received from a heat sensing device to operate a valve arm to seal and unseal an inlet passage fluidly communicating an operating chamber with a storage chamber. The operating chamber is defined by a clutch member and a housing member that are rotatably disposed relative to one another. The storage chamber is defined by the housing and is in fluid communication with the operating chamber via a discharge passage and the inlet passage. A pump displaces fluid from the operating chamber through the discharge passage into the storage chamber. The inlet passage directs fluid when unsealed from the storage chamber to the operating chamber. The valve arm is moved in one direction in response to inducing a magnetic field and in the other direction by a spring when the magnetic field is not induced. Fluid is disposed within the coupling and, when located in the operating chamber, transmits torque from the clutch to the housing. The magnetic field is induced and terminated by an electrical control at a controlled pulse rate dependent upon a signal from the heat sensing device to control the amount of fluid entering the operating chamber and thus control the speed of the housing.

8 Claims, 6 Drawing Figures

PULSE CONTROL OF AN ELECTRO MAGNETICALLY ACTUATED VISCOUS FLUID COUPLING

This invention relates generally to viscous fluid couplings and more particularly to viscous fluid couplings which are actuated from the disengaged condition to the engaged condition by an electro magnet in response to temperature changes in a sensed medium.

Viscous fluid couplings have received wide acceptance in the automotive industry for controlling the amount of power needed to rotate the radiator cooling fan. The most common form of such viscous fluid couplings is the air temperature response type coupling that is illustrated U.S. Pat. No. 3,055,473. In certain applications, however, it is desirable to sense directly the water temperature in the radiator. U.S. Pat. No. 4,056,178, assigned to the assignee of this application, discloses an electro magnetically actuated viscous fluid coupling that can be used with a water temperature sensor. However, modulation of this new coupling at speeds between the disengaged speed (for example, 1000 rpm) and the engaged speed (for example, 2500 rpm) has not been possible.

Accordingly, it was an object of the present invention to provide an electro magnetically actuated viscous fluid coupling which may be rotated at a number of select speeds, between the disengaged and the engaged speeds, that correspond to the temperature of a sensed medium, such as, water.

In accordance with the feature of the invention, a valve arm is provided in a viscous fluid coupling to be moved back and forth between a first and second position respectively in response to inducing and terminating a magnetic field to respectively provide fluid communication between the storage chamber of the coupling and the operating chamber via a fluid inlet opening and to terminate said fluid communication via said opening. The termination of such fluid communication via the inlet opening and the maintenance of a flow of viscous fluid out of the discharge opening results in the operating chamber being emptied of fluid. Without fluid in the operating chamber, the torque transfer between the clutch and the housing is substantially reduced. By providing such fluid communication via the inlet opening, viscous fluid is permitted to flow into the operating chamber from the fluid storage chamber at a rate faster than the rate of fluid flow from the operating chamber to the fluid storage chamber via the discharge opening. This allows for a transfer of torque from the clutch to the housing via the fluid within the operating chamber. By periodically opening and closing the inlet opening while maintaining the discharge opening constantly open, it has been determined by applicant that the speed of the housing may be controlled at a number of select speeds between the disengaged speed and the engaged speed of the housing.

Figure 1:
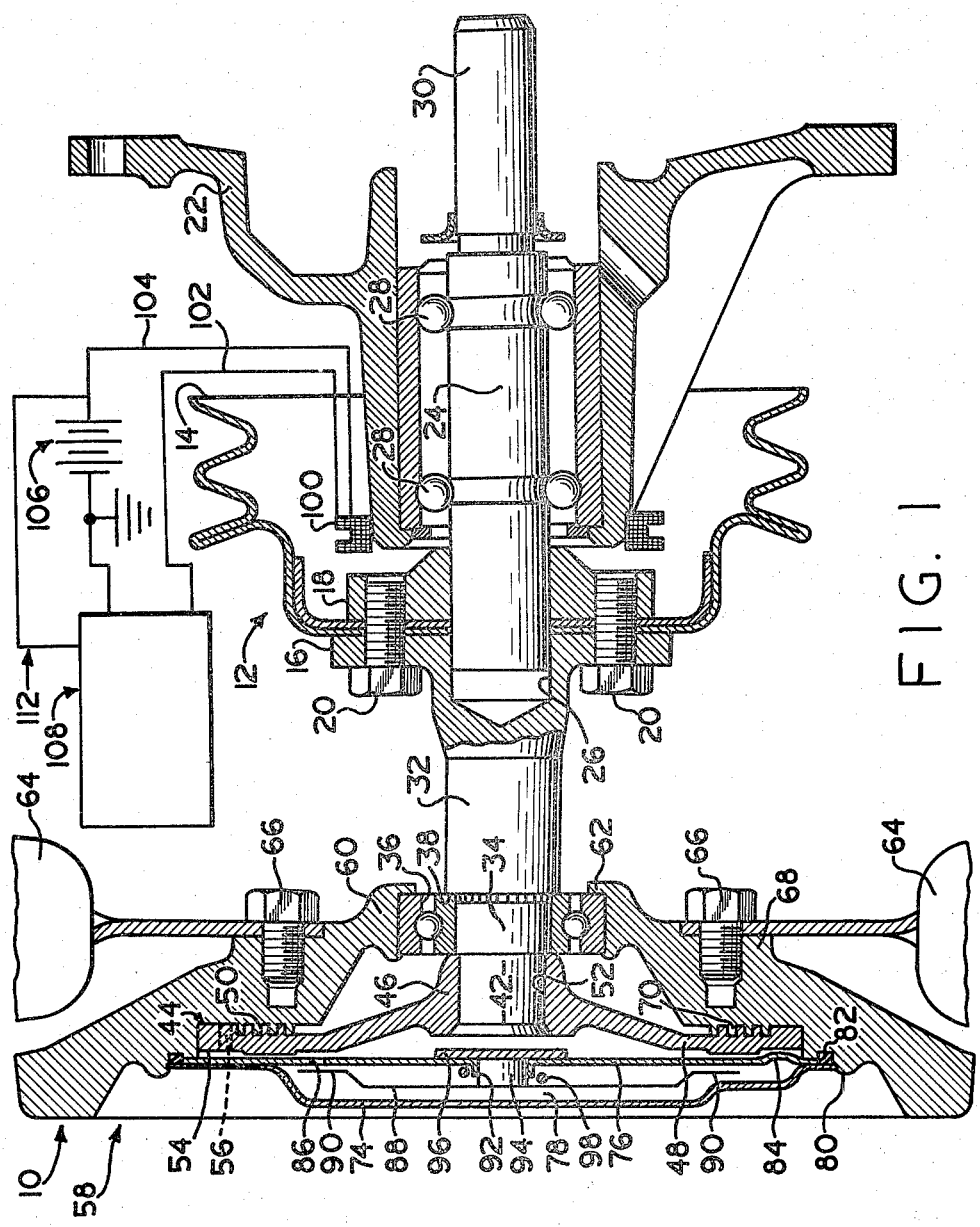
FIG. 1 is a side elevational view, taken along the center line, of a viscous fluid coupling illustrating the inventive concept.

A viscous fluid coupling 10 is illustrated in an operating condition with an accessory driving structure 12. A pulley 14 is connected to a shaft flange 16 and a companion hub plate 18 by bolts 20. A water pump housing 22 supported on an engine (not shown) rotatably supports a stub mounting shaft 24 which is secured to plate 18 and has one end located within an opening 26 in flange 16. Bearings 28 are interposed between shaft 24 and housing 22. End 30 of shaft 24 is used to drive a water pump (not shown). Pulley 14 is suitably driven by a belt from the engine to provide a driving input for both coupling 10 and the water pump.

Flange 16 is integral with a driving shaft 32 of coupling 10. Shaft 32 is provided with a reduced intermediate portion 34 which is engaged with an inner race of ball bearing assembly 36. A shoulder 38 on shaft 32 restrains axial movement of ball bearing 36 in one direction. Another shaft portion 42 is connected to intermediate portion 34.

A clutch member 44 is provided with a hub portion 46 and a plate portion 48 having a plurality of concentric annular lands 50. Hub portion 46 is provided with a straight wall opening 52 which has an interference fit with portion 42 so that clutch 44 rotates with and is actually retained on shaft 32. Axial movement of the inner race of bearing 36 in the other direction is restrained by hub portion 46.

An annular recess 54 is formed on plate 48. A pair of diametrically opposed axially directed holes 56 are disposed slightly radially outwardly of lands 50 and terminate at one end in recess 54 and at the other end adjacent lands 50. As is well known, a pair of diametrically opposed radially directed channels (not shown) which are circumferentially coincident and in communication with holes 56 traverse lands 50.

A fan support housing member 58 includes a hub 60 and has an interference fit with the outer race of ball bearing assembly 36. Housing 58 is retained axially relative to bearing assembly 36 by shoulder portions 62 and 63. A plurality of fan blades 64 are secured to housing 58 by bolts 66.

Cooling fins (not shown) are formed on the body portion 68 of housing 58 adjacent fan blades 64. The fins are arranged to provide additional area on housing 58 to dissipate heat which is generated in coupling 10.

A plurality of concentric annular lands 70 are formed on body portion 68. Lands 70 are interdigitated with lands 50 to form a portion of the fluid operating chamber.

A cover plate 74 and a valve plate 76 cooperate to define a fluid storage chamber 78. The valve plate cooperates with body portion 68 to define the operating chamber. The peripheral portion of cover plate 74 is secured to body portion 68 by an annular spun over portion 80 to retain plates 74 and 76 relative to body portion 68. An O ring 82 is disposed in an annular recess to retain fluid within coupling 10.

A pump is defined on valve plate 76 by notched portion 84 which fits within recess 54. As defined in U.S. Pat. No. 3,055,473 and made a part hereof, viscous fluid in the operating chamber is directed by centrifugal force to the periphery of clutch 44. Notched portion 84 within recess 54 creates a high pressure area along its leading edge during rotation of coupling 10. A hole (not shown) is provided in valve plate 76 at said leading edge to direct fluid out of the operating chamber into the fluid storage chamber.

Rotation of shaft 32 results in rotation of clutch 44. With viscous fluid in the operating chamber a viscous drive is created between clutch 44 and housing 58 to rotate the housing. The majority of the rotational drive torque transmitted from the clutch to the housing is created in the area of lands 50 and 70.

Valve plate 76 further includes an inlet opening 86 radially disposed relative to the rotational axis of shaft 32. The inlet opening communicates fluid from storage chamber 78 to the operating chamber. Appropriate axially extending holes may be provided in clutch 44 to direct the viscous fluid from valve plate 76 to the area of lands 50 and 70.

A valve arm 88 is provided to be moved in an axial direction between a first position as illustrated in FIG. 1 and a second position in which an outer portion 90 covers inlet opening 86 and prevents fluid from flowing from fluid storage chamber 78 to the operating chamber. Valve plate 76 further includes an axially aligned hole 92. An armature 94, made of a magnetic material such as steel, projects through the valve plate hole 92 and includes a shoulder portion 96. A coil spring 98 encircles armature 94 and is interposed between valve arm 88 and valve plate 76. The spring acts to bias the armature to the left in FIG. 1. Shaft 32 is preferably flared out around clutch 44 as illustrated in order to aid in retention of the clutch relative to the shaft. Shaft 32 is made of a magnetic material such as steel. The distance between the outer end portion of shaft 32 and shoulder 96 of armature 94 is maintained to a minimum for reasons to be hereinafter explained.

An electrical coil is provided in encircling relationship to housing 22. Appropriate leads 102 and 104 are provided to coil 100 and to an electrical source of energy 106 and a circuit 108 to energize the coil in response to a signal. Upon energization of coil 100, a magnetic field is induced within shaft 32. The magnetic field is of significant force to draw armature 94 to the right in FIG. 1 against the spring and toward shaft 32. This drawing force is a solenoid type action. Upon movement of armature 94 toward shaft 32, outer portion 90 of valve arm 88 moves from its first position to its second position in which inlet opening 86 in valve plate 76 is sealed.

Perferably, shoulder 96 does not contact shaft 32. Contact between the shoulder and the shaft would result in rubbing which is detrimental to coupling life. Such contact is prevented by the prior contact of outer portion 90 with valve plate 76.

In order to maintain the greatest possible magnetic field within shaft 32 with the least amount of electrical energy, clutch 44 and housing 58 are made of non-magnetically permeable materials such as aluminum. The use of aluminum further aids in the dissipation of heat from coupling 10. It is contemplated that coil 100 may also be located in other places such as in encircling relationship to shaft 32, directly on shaft 32 with the electrical contacts from leads 102 and 104 being provided through slip rings, or on a separate shaft secured to cover plate 74 and located adjacent armature 94 on the axis of rotation of coupling 10. The location of armature 94 is preferably along the axis of rotation of shaft 32 to prevent the introduction of centrifugal force on its operation. For this reason, valve arm 88 is also preferably balanced around the axis of shaft 32.

Figure 2:
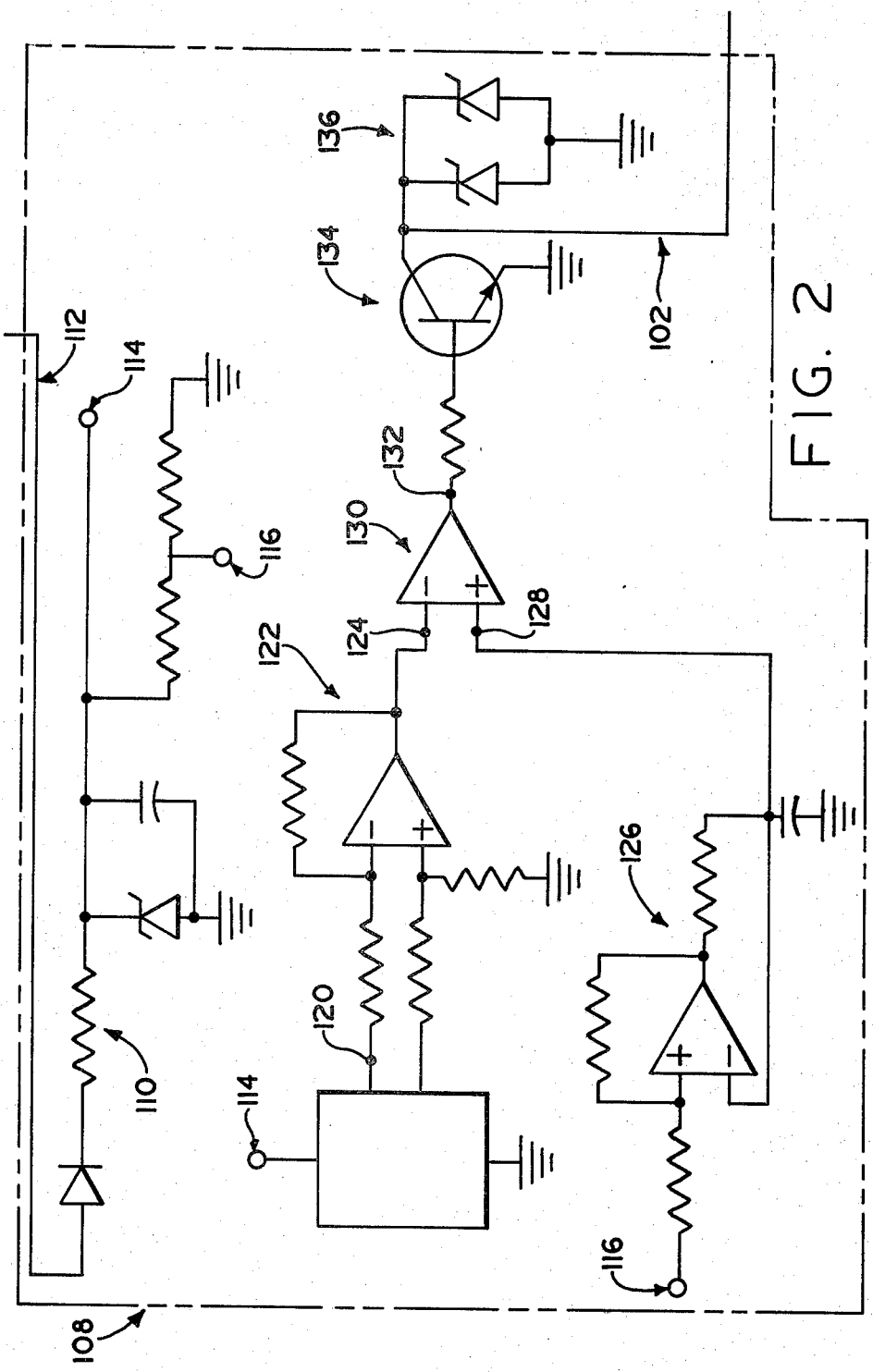
FIG. 2 is a schematic view of an electrical circuit used to operate the coupling of FIG. 1.
Figure 4:
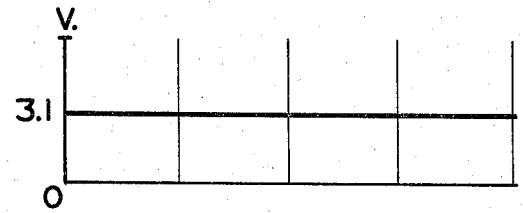

The electrical control circuit of FIG. 2 consists of a constant voltage portion 110 which supplies, from a 12 volt power source 106 via lead 112, a current flow at a controlled voltage of 6.2 volts to junction 114 and a current flow at a reference voltage of 3.1 volts to junction 116. The current flow from junction 114 is directed into a circuit 118 which supplies a current flow to junction 120 at a voltage that is proportional to the temperature sensed by the circuit. A portion of circuit 118 is located in the water of the radiator of a vehicle. An amplifier 122 amplifies the voltage from junction 120 and sends a current flow at a voltage at, for example, 3.1 volts to junction 124. The voltage at junction 124 is illustrated in FIG. 4 and represents the sensing of a given constant water temperature in the radiator over a given period of time.

Figure 3:
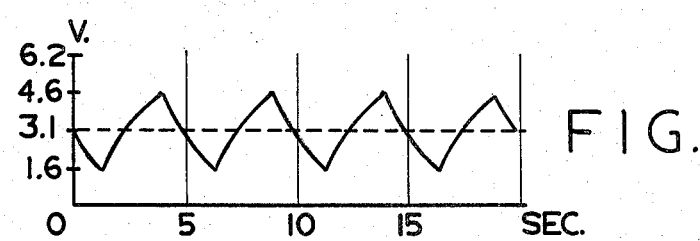
FIGS. 3–6 are graphs of voltage levels vs. time that exist at defined locations within the circuit of FIG. 2 under a given operating condition.
Figure 5:
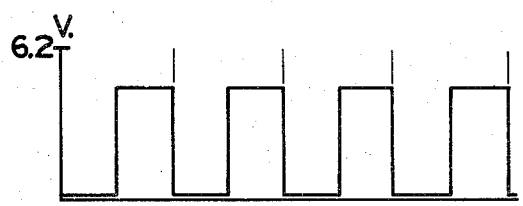

The current flow from junction 116 is directed to a ramp oscillator 126 which provides to junction 128 a current flow having a voltage-time graph similar to that illustrated in FIG. 3. A comparator 130 is connected to junctions 124 and 128 and supplies a signal at a given positive voltage of, for example, 4.7 volts or zero volts to junction 132. This voltage signal as illustrated in FIG. 5, is a square wave signal when plotted against time having a duty cycle that depends upon the given inputs to comparator 130. As disclosed, the duty cycle is fifty percent.

Figure 6:
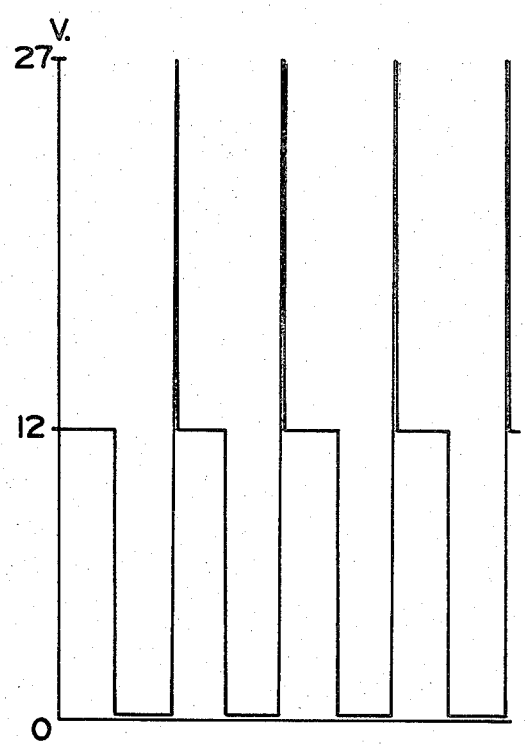

Junction 132 is connected to an on-off switching circuit 134 which either directs a current flow across coil 100 via leads 102 and 104 at a given voltage, for example, 12 volts or terminates such current flow. A pair of zener diodes 136 are connected to switching circuit 134 to limit voltage spikes to, for example, 27 volts when the current flow is terminated through coil 100. Diodes 136 thereby protect the transistor in circuit 134. The voltage through coil 100 is illustrated in the graph of voltage vs. time in FIG. 6.

When current flows through coil 100, a magnetic field is induced within shaft 32 which draws armature 94 to the right in FIG. 1 thus closing inlet opening 86 and terminating fluid flow into the operating chamber. Fluid, however, is constantly being pumped from the operating chamber to the storage chamber by pumping element 84 through the discharge opening. The amount of fluid within the operating chamber determines the degree of torque transfer from clutch 44 to housing 58 and thus the speed of fan blades 64. With appropriate adjustments to circuit 108 coil 100 can be energized and de-energized at a rate (duty cycle) that is related to the water temperature sensed by circuit 118. The rate of energization and de-energization of coil 100 will control the speed of fan blade 64 between the disengaged speed and the engaged speed. Although the disclosed system does possess some problems in operation, test results have indicated that modulation of the speed of coupling 10 is possible by pulsing the movement of armature 94.

The most significant thing that has been recognized by applicant is that the speed of coupling 10 can be modulated by pulsing the operation of the valve arm in response to a given input to control the speed of the fan blades at at least one or two speed ranges between the disengaged speed and the engaged speed of the coupling. The pulsing of the valve arm results in spurts of fluid being directed into the operating chamber. This occurs while the pumping element is constantly directing fluid from the operating chamber to the storage chamber. With the foregoing in mind it is further accordingly believed by applicant that with appropriate sizing of the inlet and discharge openings and with a pulse control that would seal and unseal the discharge opening and not effect the inlet opening that the speed of a coupling may be controlled between the disengaged and engaged speeds. This latter idea falls within the scope of the appended claims.

What is claimed is:

1. A viscous fluid coupling member comprising
a first member;
a second member rotatably disposed relative to said first member;
an operating chamber defined between said first and second members;
a fluid storage chamber adjacent said operating chamber;
fluid disposed within said storage chamber and movable into said operating chamber to provide in said operating chamber a medium to transmit rotational movement from one of said members to the other of said members;
pump means to move said fluid through a discharge opening from said operating chamber to said storage chamber to reduce said rotational movement;
inlet means to move said fluid through an inlet opening from said storage chamber to said operating chamber to increase said rotational movement;
a valve member movable in response to induction of a magnetic field from a first position to a second position, one of said positions allowing fluid movement between said chambers through one of said openings and the other of said positions blocking said fluid movement through said one opening;
means to bias said valve member to said first position; and
means for selectively inducing and terminating said magnetic field to pulse the movement of said valve member between said first and second positions to control the amount of rotational movement.

2. A viscous fluid coupling according to claim 1 wherein:
said magnetic field is induced by an electro magnet; and
an electric circuit actuates and deactuates said electro magnet.

3. In a vehicle having a water cooled internal combustion engine, a viscous fluid coupling according to claim 2 wherein the rate of said actuation and deactuation of said electro magnet is related to the temperature of said water.

4. A viscous fluid coupling according to claim 1 wherein:
said one opening is said inlet opening; and
said pump means is constantly moving fluid through said discharge opening from said operating chamber to said storage chamber during said rotational movement of said one member.

5. A viscous fluid coupling according to claim 1 wherein:
said other member rotates at a maximum speed when said valve member is in said one position for a relatively long period of time and for a given speed of said one member;
said other member rotates at a minimum speed when said valve member is in said other position for a relatively long period of time and said one member is rotating at said given speed; and
said other member rotates at a speed between said minimum speed and said maximum speed when said valve member is pulsed between said first and said second positions over a relatively short period of time and said one member is rotating at said given speed.

6. A viscous fluid coupling according to claim 1, 2, 3, 4 or 5 wherein:
said one member is a clutch secured to an input shaft; and
said other member is a housing encircling said clutch and rotatably supported on said input shaft.

7. A viscous fluid coupling according to claim 1 wherein:
said members are radially disposed and rotatable about a common axis;
said chambers are axially disposed along said axis and are separated by a radially extending valve plate, said valve plate including said inlet opening located radially from said axis of rotation; and
said valve member is mounted for axial movement in said valve plate and includes a radially disposed valve arm that is movable from a position sealing said inlet opening when said valve member is in said one position to a position spaced from said inlet opening when said valve member is in said other position.

8. A viscous fluid coupling according to claim 7 wherein:
said valve plate and said members are made of a non-magnetically permeable material;
one of said members is secured to a shaft located on said axis and made of a magnetic material;
said means for selectively inducing and terminating said magnetic field is positioned to induce said magnetic field in said shaft; and
said valve arm includes an armature made of a magnetic material and located adjacent said shaft.

* * * * *